Billy G. Broach,
INVENTOR.

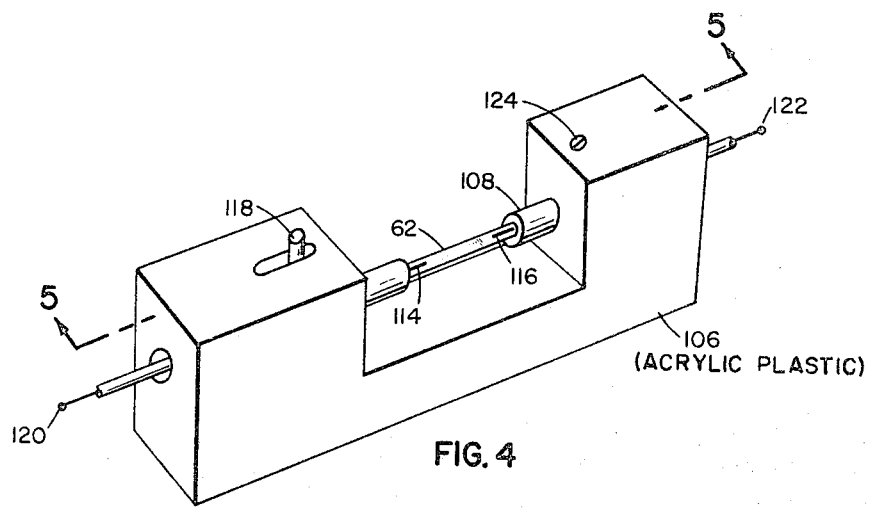
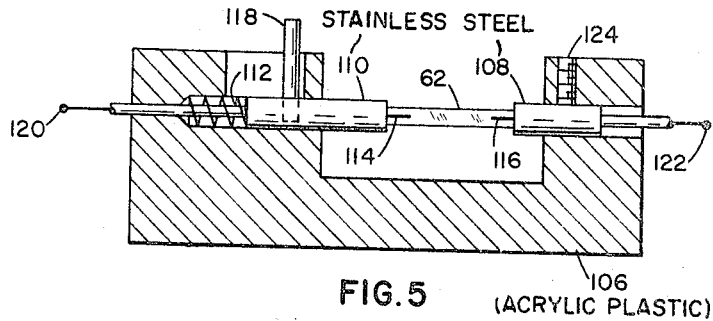
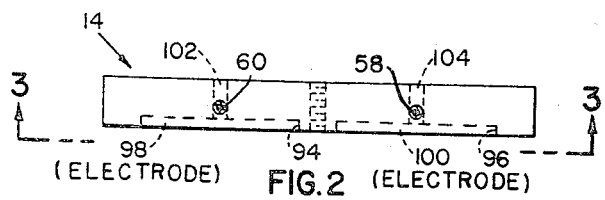
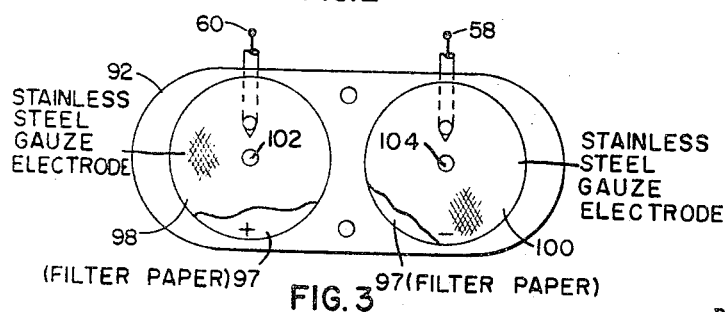

United States Patent Office 3,399,666
Patented Sept. 3, 1968

3,399,666
MEASUREMENT SYSTEM FOR CLINICAL DIAGNOSIS
Billy G. Broach, Huntsville, Ala., assignor to Heat Technology Laboratory, Inc., Huntsville, Ala., a corporation of Alabama
Filed Nov. 9, 1964, Ser. No. 409,671
8 Claims. (Cl. 128—2.1)

ABSTRACT OF THE DISCLOSURE

A measurement system for the clinical diagnosis of cystic fibrosis wherein a source of direct current is first applied to the skin of a subject and a sweat sample produced. The sweat sample is then subjected to conductivity measurements through a synchronous switching system interconnecting the source of direct current with the sample.

---

Figure 1:
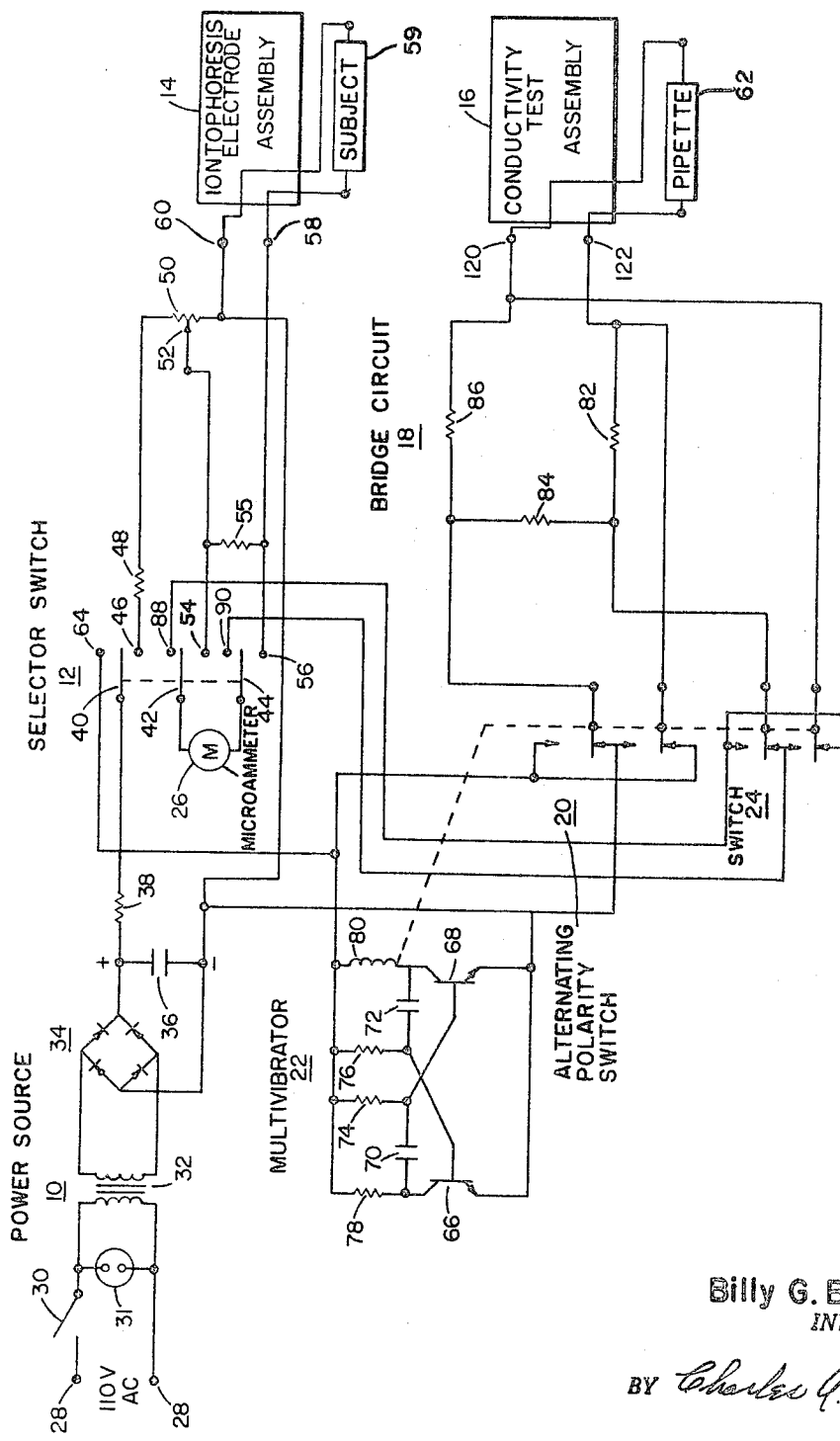

This invention relates to measurement systems and particularly to an electrical measurement system for use by physicians in the diagnosis of cystic fibrosis of the pancreas.

It has been previously determined that an elevation of the salt concentration is found in the eccrine sweat of at least 99% of persons who are determined to be afflicted by cystic fibrosis of the pancreas. In the case of children, only in conditions of deficiency of salt-hormone output by the adrenal (Addison's disease) are there equally high concentrations. Likewise, in the case of children, the concentrations found are higher than with adults and they do not overlap salt concentrations found in healthy children. In the case of adults, while there is some overlapping of values between an afflicted and a normal adult the analysis of salt concentration is still of considerable value in diagnosis of cystic fibrosis.

Production of sweat for concentration analysis may be produced by different techniques. One technique involves pilocarpine iontophoresis production of local sweating. This technique is painless, of short duration and effective in the production of maximum stimulation of the sweat glands. In principle, it consists of the passage of a small electric current thru the skin which transports the ions of the pilocarpine. This drug produces sweating without systemic symptoms in the local area of the iontophoresis. A vapor barrier, such as a sheet or film or polyethylene is used to cover the area of iontophoresis and sweat collects under this barrier as the sweat glands wash out as a result of the current stimulation. The vapor barrier, of course, prevents evaporation and collects the sweat to be analysed.

While the theory of operation of the steps to be taken in accomplishing the diagnostic procedures outlined above has been established and tests have been made in accordance with the theory, there have been no complete and convenient devices or systems available for expeditiously performing the tests. Accordingly, it is the object of this invention, to provide in a complete and coordinated system, accurate and convenient means for accomplishing a diagnosis as aforesaid.

In accordance with the invention, a measurement system for the clinical diagnosis of cystic fibrosis would be constructed as follows. A power supply capable of supplying 0 to 25 volts D.C. (direct current) is employed as a source of power both for the production of the necessary local sweating and analysis of the sweat sample produced. Current measuring or indicating means in the form of a D.C. microammeter also functions for both modes and is selectively connected in the circuit for each mode by a master selector switch. While direct current is an appropriate source for producing the iontophoresis and ion concentration to secure the sweat sample for analysis, it has been found that sample analysis thru conductivity measurement, which is the technique employed by the invention, results in inaccuracies due to ionization of the sample by the measurement current. To overcome this, it is a feature of this invention that when the selector switch is in the analysis or measurement mode that the measurement current is changed to an alternating one. This however produces the disadvantage of alternating current (A.C.) measurement of small currents which normally require more elaborate and expensive measurement means. However, as a feature of this invention direct current (D.C.) measurements are retained.

To accomplish this, means are provided to synchronously and continuously switch the power input and measurement output leads of an electrical bridge circuit, which is the basic measurement means, and to thus continuously vary the polarity on these leads. By such means there is applied thru the sweat sample, which is connected to the input of the bridge, an alternating current, but, as the output of the bridge is switched in unison, there is no net change of polarity at the output of the bridge and thus a simple microammeter of the D.C. variety may be employed for all output measurements. As still another feature of the invention synchronous switching is simply achieved by means of a free running transistor multivibrator which operates a relay with multiple contacts which are arranged to continuously switch between contact positions.

Other objects, features and advantages of this invention will become apparent from the following description and claims when considered together with the accompanying drawings in which:

FIG. 1 is an electrical circuit diagram of an embodiment of the invention;
FIG. 2 is an elevation view of an electrode assembly employed to induce sweating;
FIG. 3 is a bottom view along lines 3—3 of FIG. 2;
FIG. 4 is a pictoral view of a conductivity test assembly; and
FIG. 5 is a section view of FIG. 4 along the lines 5—5.

Referring now to the drawings, the embodiment of the invention shown therein is comprised basically of direct current (D.C.) power source 10 which provides an output of between 0 and 25 volts at 4 millamperes; triple pole, double throw, selector switch 12 which directs current flow to either input or output functional circuitry; iontophoresis electrode assembly 14, which, with selector switch 12 positioned in an output mode, is energized from power source 10; microsample conductivity test assembly 16; alternating polarity switch 20, which, under the control of free running multivibrator 22, provides from direct current source 10, thru selector switch 12, an alternating current (A.C.) power input to bridge circuit 18 and test assembly 16; and alternating polarity switch 24, which, is also operated by multivibrator 22 and synchronously with switch 20, switch 24 being connected to the output of bridge circuit 18 and functioning to convert this output to direct current which is read-out thru selector switch 12 on microammeter 26.

Power source 10 is adapted to receive a 110 volt A.C. input at terminals 28 and with switch 30 closed (it is shown open) and provide thru transformer 32 a 24 volt input to diode bridge rectifier 34. Indicator lamp 31 glows when switch 30 is closed. The direct current output of rectifier 34 of approximately 30 volts is smoothed by filter capacitor 36 and applied thru resistor 38 and power input movable contact 40 of switch 12 to either iontophoresis electrode assembly 14 (with movable contact 40 in lower position) or conductivity test assembly 16 and related circuitry (with movable contact 40 in upper position).

With contact 40 of switch 12 in its lower position, and accordingly, contacts 42 and 44 of switch 12 in their lower position by virtue of their being ganged with contact 40, current flow will occur from movable contact 40, thru fixed contact 46, resistor 48, and potentiometer 50. At movable contact 52 of potentiometer 50 the current flow splits into two paths, with one path passing thru movable contact 52, fixed contact 54 of switch 12, movable contact 42 of switch 12, microammeter 26 (shunted with scale calibration multiplier resistor 55), movable contact 44 of switch 12, fixed contact 56 of switch 12, terminal 58 of electrode assembly 14, subject 59 being tested and terminal 58 of electrode assembly 14 back to power source 10. The second current path continues on thru the full resistance of potentiometer 50 back to power source 10. By varying the position of movable contact 52, the desired current flow thru the subject as read out on microammeter 26, may be maintained, normally between 1.5 and 2.0 milliamperes. Shunt resistor 55 is chosen to reduce the sensitivity of microammeter 26 (having a basic movement of 0–50 microamperes), during this function, to 0–5 milliamperes.

After the subject 59 has been subjected to the heating current thru iontophoresis electrode assembly 14, and the sweat sample collected in pipette 62 (a small tube open at both ends and providing a liquid column of predetermined length and cross-section) by capillary action and the pipette placed in conductivity test assembly 16, switch 12 is positioned in its upper position and the circuit conditioned for measurement of the conductivity of the sample. In this mode of operation electrode assembly 14 is deenergized and multivibrator 22 and bridge 18 (thru switch 20) are energized thru fixed contact 64 of switch 12.

Multivibrator 22 is a conventional free running transistor two stage circuit wherein the output of the first stage NPN transistor 68 and the output of the second and like stage is coupled back to the input of the first stage. The frequency of the resulting oscillations is determined basically by the time constant of the coupling elements, capacitors 70 and 72 and base resistors 74 and 76. In practice this frequency is adjusted to be within the range of the relay employed and as an example operates at a frequency of 4 cycles per second. Resistor 78 provides a load circuit for transistor 66 and relay coil 80 provides a load circuit for transistor 68 and serves to synchronously switch switches 20 and 24 with respect to which it is electromagnetically associated. Actually, relay coil 80 and switches 20 and 24 (each being double pole-double throw) form a single relay assembly.

The basic elements of electrical bridge circuit 18 are conventional and consist of resistors 82, 84 and 86, with the sample in pipette 62 making up the fourth resistance element of the bridge. The power input and power output circuits are not conventional and present a feature of this invention. As stated above, it has been found that direct current flow thru the sample produces erroneous readings due to the ionization of the sample. On the other hand, due to the small measurement currents which must be employed for accuracy, the employment of an alternating current (A.C.) measurement system would require more expensive and complex instruments.

In accordance with this invention and as previously explained, this problem is solved by synchronously alternating the power input and measurement output of bridge circuit 18 to achieve an A.C. input thru the sample in pipette 62 and switching the output to reconvert A.C. current to D.C. at the output of the bridge. This is accomplished by providing power input from D.C. source 10 thru alternating switch 20 and the measurement output to meter 26 thru alternating switch 24. The power input circuit is thru contacts 40 and 64 of switch 12 and output circuit is thru contacts 88 and 42 of switch 12, meter 26, and contacts 44 and 90 of switch 12.

Iontophoresis electrode assembly 14 is formed of an insulating body member or mounting base 92, as for example of acrylic plastic, and supports in recessed portions 94 and 96, stainless steel gauze insert electrodes 98 and 100 to which are electrically connected electrical terminal leads 60 and 58, respectively. When the assembly is being used, pieces of filter paper 97 of the same diameter as electrodes 98 and 100 are inserted in recessed portions 94 and 96 between the electrodes and the patient, the electrode assembly being placed longitudinally over a hair-free area of the patient's forearm. The assembly is held securely by rubber straps, not shown, to allow a firm contact but not to decrease circulation in the extremity. A pilocarpine solution is poured through a filling hole 102 to thoroughly saturate the filter paper associated with electrode 98, electrode 98 to be positively energized; and a sodium nitrate solution is poured through filling hole 104 to thoroughly saturate the filter paper associated with electrode 100, electrode 100 to be negatively energized.

Conductivity test assembly 16 provides an arrangement to achieve an electrical circuit thru a fluid filled small tube, here the tube being pipette 62. This assembly has a mounting base 106 of insulating material, such as acrylic plastic, for holding a fixed electrode 108 and retractable electrode 110, electrodes 108 and 110, being typically of stainless steel. Retractable electrode 110 is spring loaded by a spring 112 to hold pipette 62 securely with needle electrode ends 114 and 116, of a diameter to fit snugly into the ends of pipette 62 and extending into the ends of pipette 62 for a short distance, e.g., ⅛ of an inch. A release arm 118, attached to electrode 110, provides a convenient means of retracting electrode 110 to permit engagement and disengagement with pipette 62. Electrical terminal leads 120 and 122 provide interconnection between test assembly 16 and bridge circuit 18. Electrode 108 is secured in position by lock screw 124.

With electrode assembly 14 set up and connected to a patient as described above and with selector switch 12 set with its moveable contacts in the lower position, potentiometer 50 is adjusted to provide a reading of 1.5 to 2.0 milliamperes of current flow on meter 26, this rate of current flow is maintained to produce iontophoresis on the skin surface of the patient for approximately five minutes. After this, the current is reduced to zero by potentiometer 50 and electrode assembly 14 is removed. The sweat glands are then allowed a period of approximately five minutes to "wash out" initial secretion, after which the inner arm is rinsed thoroughly with tap water and then the area of the iontophoresis washed with a Na-free water. Next this area is wiped dry with tissues.

A vapor barrier, e.g., a sheet of thin polyethylene plastic, is then placed over the area of iontophoresis and held securely in place by adhesive tape to provide a positive seal and allowed to remain there for approximately 30 minutes during which time beads of sweat collect under the vapor barrier. At the end of this period the vapor barrier is removed and the sweat collected from the patient's arm and parafilm by capillary action in pipette 62. Care must be taken in filling pipette 62 so that no bubbles are collected. Next, pipette 62 is inserted in test assembly 16 as shown in FIGS. 4 and 5 and with selector switch 12 in its upward position, the conductivity, and thus Na concentration of sweat is read out on meter 26. By a simple calibration of meter 26 in terms of the volume of the sample in pipette 62 one can read out Na concentration in units of milliequivalents per liter (meq./l.).

In a young unafflicted child, less than 10 years of age, the Na concentration averages about 14 meq./l. while that of one with cystic fibrosis averages about 110 meq./l. With adults, as stated above some overlapping of readings between those so afflicted and those who are not, may occur, however test still produces valuable diagnostic information.

While the invention has been described largely in terms of a single embodiment it will be appreciated that it is not to be so limited and that variations in construction may be made without departure from the true spirit and scope of the invention as defined in the appended claims.

I claim:

1. A measurement system for clinical diagnosis comprising:
   (A) a source of direct current;
   (B) first and second switching means, operating synchronously, each having a two-pole input and two-pole output and including means for providing at said output a continually reversing polarity connection to said input;
   (C) current inducing means provided by first electrical connections to said source of direct current for producing a current flow between separated skin portions of a patient;
   (D) conductivity test fixture means comprising means for passing a current through a volume of liquid of predetermined length and cross-section;
   (E) current indicating means;
   (F) conductivity measurement means provided by second electrical connections including power input connections thru said first switching means and said source of direct current thru said conductivity test fixture means, and including measurement output connections thru said second switching means to said current indicating means; and
   (G) selector switching means for selectively making either said first or second connections.

2. A measurement system for clinical diagnosis comprising:
   (A) a source of direct current;
   (B) first and second switching means, operating synchronously, each having a two-pole input and two-pole output and including means for providing at said output a continually reversing polarity connection to said input;
   (C) current inducing means provided by first electrical connections to said source of direct current for producing a current flow between separated skin portions of a patient comprising:
      (1) first and second metallic gauze electrodes, and
      (2) an insulating mounting base having a first recessed portion housing said first metallic gauze electrode and a second recessed portion spaced from said first recessed portion housing said second metallic gauze electrode;
   (D) conductivity test fixture means comprising means for passing a current through a volume of liquid of predetermined length and cross-section;
   (E) current indicating means,
   (F) conductivity measurement means provided by second electrical connections including a power input connection through said first switching means to said source of direct current thru said conductivity test fixture means, and including a measurement output connection through said second switching means to said current indicating means; and
   (G) selector switching means for selectively making either first or second connections.

3. A measurement system for clinical diagnosis comprising:
   (A) source direct current;
   (B) first and second switching means, operating synchronously, each having a two-pole input and two-pole output and including means for providing at said output a continually reversing polarity connection to said input;
   (C) current inducing means provided by first electrical connections to said source of direct current for producing a current flow between separated skin portions of a patient;
   (D) conductivity test fixture means for passing a current thru a volume of liquid of a predetermined length and cross-section comprising:
      (1) a pipette open at both ends and having a predetermined length and cross-section,
      (2) a mounting base of insulating material,
      (3) a fixed electrode attached to said mounting base and adapted to extend into one end and make an electrical contact with the interior proximate to one end of said pipette, and
      (4) a retractable electrode movably attached to said base and adapted to removably extend into the opposite end of said pipette for making an electrical contact with the interior proximate said opposite end of said pipette;
   (E) current indicating means;
   (F) conductivity measurement means provided by second electrical connections including a power input connection through said first switching means to said source of direct current thru said conductivity test fixture means, and including a measurement output connection through said second switching means to said current indicating means; and
   (G) selector switching means for selectively making either said first or second connections.

4. A measurement system for clinical diagnosis comprising:
   (A) a source of direct current;
   (B) first and second switching means, operating synchronously, each having a two-pole input and two-pole output and including means for providing at said output a continually reversing polarity connection to said input;
   (C) current inducing means provided by first electrical connections to said source of direct current for producing a current flow between separated skin portions of a patient comprising:
      (1) first and second metallic gauze electrodes, and
      (2) an insulating mounting base having a first recessed portion housing said first metallic gauze electrode and a second recessed portion spaced from said first recessed portion housing said second metallic gauze electrode:
   (D) conductivity test fixture means for passing a current thru a volume of liquid of a predetermined length and cross-section,
      (1) a pipette open at both ends and having a predetermined length and cross-section,
      (2) a mounting base of insulating material,
      (3) a fixed electrode attached to said mounting base and adapted to extend into one end and make an electrical contact with the interior proximate to one end of said pipette, and
      (4) a retractable electrode movably attached to said mounting base and adapted to removably extend into the opposite end of said pipette for making an electrical contact with the interior proximate to the said opposite end of said pipette;
   (E) current indicating means;
   (F) conductivity measurement means provided by second electrical connections including a power input connection through said first switching means to said source of direct current thru said conductivity test fixture means, and including a measurement output connection thru said second switching means to said current indicating means; and
   (G) selector means for selectively making either said first or second connections.

5. The measurement system set forth in claim 4 wherein said first and second switching means comprise:
   (A) an electrical relay assembly having first and second double-pole double-throw sets of relay contacts; and
   (B) energizing means for alternately energizing and deenergizing said relay assembly.

6. The measurement system set forth in claim 5 wherein said energizing means comprises a free-running multivibrator powered by said source of direct current.

7. A skin contacting electrode assembly comprising:
(A) first and second metallic gauze electrodes;
(B) a mounting base for supporting said electrodes and electrically insulating one said electrode from the other including:
  (1) a shoulder portion surrounding first and second recessed portion on one side of said mounting base, said first and second metallic gauze electrodes being positioned in said recessed portions, respectively,
  (2) said metallic gauze electrodes being positioned to provide a gauze surface area flush with said shoulder portion,
  (3) a first hole communicating between said first recessed portion and a side of said mounting base opposite said one side of said mounting base,
  (4) a second hole communicating between said second recessed portion and a side of said mounting base opposite said one side of said mounting base, and
(C) a first electrical terminal lead connected to said first metallic gauze electrode and a second electrical terminal lead connected to said second metallic gauze electrode.

8. A measurement system for clinical diagnosis comprising:
(A) a source of direct current:
(B) first and second switching means, operating synchronously, each having a two-pole input and two-pole output and including means for providing at said output a continually reversing polarity connection to said input;
(C) current inducing means including skin contacting electrode assembly comprising:
  (1) first and second metallic gauze electrodes;
  (2) a mounting base for supporting said electrodes and electrically insulating one said electrode from the other including:
    (a) a shoulder portion surrounding first and second recessed portions on one side of said mounting base said first and second metallic gauze electrodes being positioned in said recessed portions, respectively,
    (b) said metallic gauze electrodes being positioned to provide a gauze surface area flush with said shoulder portion,
    (c) a first hole communicating between said first recessed portion and a side of said mounting base,
    (d) a second hole communicating between said second recessed portion and a side of said mounting base opposite said one side of said mounting base, and
  (3) a first electrical terminal lead connected to said first metallic gauze electrode and a second electrical terminal lead connected to said second metallic gauze electrode;
(D) conductivity test fixture means comprising means for passing a current through a volume of liquid of predetermined length and cross-section;
(E) current indicating means;
(F) conductivity measurement means provided by second electrical connections including a power input connection through said first switching means to said source of direct current thru said conductivity test fixture means, and including a measurement output connection through said second switching means to said current indicating means; and
(G) selector switching means for selectively making either said first or second connections.

References Cited
UNITED STATES PATENTS

| | | | |
|---|---|---|---|
| 2,678,692 | 5/1954 | Ranseen | 161—15 |
| 2,704,064 | 3/1955 | Fizzell et al. | 128—2.1 |
| 2,985,172 | 5/1961 | Jones | 128—416 |
| 3,289,671 | 12/1966 | Troutman et al. | 128—2.1 |
| 3,295,515 | 1/1967 | Kahn | 128—2.06 |

RICHARD A. GAUDET, *Primary Examiner.*

SIMON BRODER, *Assistant Examiner.*